United States Patent [19]

Sekhar

[11] Patent Number: 5,316,718
[45] Date of Patent: May 31, 1994

[54] COMPOSITE ELECTRODE FOR ELECTROCHEMICAL PROCESSING HAVING IMPROVED HIGH TEMPERATURE PROPERTIES AND METHOD FOR PREPARATION BY COMBUSTION SYNTHESIS

[75] Inventor: Jainagesh A. Sekhar, Cincinnati, Ohio

[73] Assignee: Moltech Invent S.A., Luxembourg

[21] Appl. No.: 715,547

[22] Filed: Jun. 14, 1991

[51] Int. Cl.$^5$ ................................ B22F 3/16
[52] U.S. Cl. ..................... 419/19; 419/38; 419/39; 419/44; 419/24
[58] Field of Search ............ 204/101, 290 R, 291, 204/242, 293; 502/167, 315; 544/225, 246, 296; 556/138; 282/182.1, 518, 519; 252/519; 419/11, 19, 38, 39, 44, 24; 428/539.5; 501/87, 127, 128, 134; 505/1; 149/3, 17

[56] References Cited

U.S. PATENT DOCUMENTS

| | | | |
|---|---|---|---|
| 4,374,761 | 2/1983 | Ray | 252/519 |
| 4,455,211 | 6/1984 | Ray et al. | 204/293 |
| 4,699,763 | 10/1987 | Sinharoy et al. | 419/11 |
| 4,747,873 | 5/1988 | Kamioka | 75/229 |
| 4,909,842 | 3/1990 | Dunmead et al. | 75/236 |
| 4,948,676 | 8/1990 | Darracq et al. | 428/539 |
| 4,961,778 | 10/1990 | Pyzik et al. | 75/230 |
| 5,015,343 | 5/1991 | LaCamera et al. | 204/67 |
| 5,188,678 | 2/1993 | Sekhar et al. | 148/514 |

FOREIGN PATENT DOCUMENTS

0257708 9/1988 European Pat. Off. .

OTHER PUBLICATIONS

M. B. Bevern (ed. in chief) "Encyclopedia of Materials Science", vol. 2, Pergamon Press (1986), pp. 1410–1414.
H. C. Yi et al. Journal Materials Science, 25 (1990) pp. (1159–1168).
J. W. McCauley et al. "Simultaneous Preparation . . ." Ceramic Engineer, 3 (1982) pp. 538–554.
R. W. Rice et al. "Effects of Self-Propagating . . ." Ceramic Engineering, 7 (1986) pp. 737–749.

*Primary Examiner*—Donald P. Walsh
*Assistant Examiner*—J. N. Greavees
*Attorney, Agent, or Firm*—Frost & Jacobs

[57] ABSTRACT

A composite electrode for electrochemical processing having improved high temperature properties, and a process for making the electrode by combustion synthesis. A composition from which the electrode is made by combustion synthesis comprises from about 40% to about 90% by weight of a particulate or fibrous combustible mixture which, when ignited, is capable of forming an interconnected network of a ceramic or metal-ceramic composite, and from about 10% to about 60% by weight of a particulate or fibrous filler material capable of providing the electrode with improved oxidation resistance and maintenance of adequate electrical conductivity at temperatures above 1000° C. The filler material is molybdenum silicide, silicon carbide, titanium carbide, boron carbide, boron nitride, zirconium boride, cerium oxide, cerium oxyfluoride, or mixtures thereof.

5 Claims, No Drawings

COMPOSITE ELECTRODE FOR ELECTROCHEMICAL PROCESSING HAVING IMPROVED HIGH TEMPERATURE PROPERTIES AND METHOD FOR PREPARATION BY COMBUSTION SYNTHESIS

BACKGROUND OF THE INVENTION

1. Field of the Invention

This invention relates to an electrode for use in electrochemical processing having improved oxidation and corrosion resistance in comparison to prior art electrodes used for the same purposes, which can be readily produced by a process involving combustion synthesis to form a core body having an interconnected network of a ceramic or metal-ceramic composite in which is uniformly dispersed a filler material. Although not so limited the invention has particular utility in the provision of an anode and a cathode for the electrowinning of aluminum from its ore in the Hall-Herault process. The electrode of the present invention provides improved oxidation resistance at temperatures above 1000° C. with retention of satisfactory electrical and thermal conductivity at such elevated temperatures.

2. Description of the Prior Art

U.S. patent application Ser. No. 07/648,165, filed Jan. 30, 1991, in the names of Jainagesh A. Sekhar and Sarit B. Bhaduri, and assigned to the assignee of the present application, discloses a composite electrode for electrochemical processing and a method for preparation thereof by combustion synthesis. Such an electrode comprises at least 20% by weight of a ceramic composite or a metal-ceramic composite in the form of a dimensionally stable interconnected network, at least about 15% by weight of a filler material providing desired electrochemical properties, the filler material being uniformly dispersed in the composite network, and up to about 35% by weight of a binder phase associated with the network and the filler material. The ceramic or metal-ceramic composite network is derived from a wide range of combustible mixtures which, when ignited, form the composite interconnected network or core. Filler materials are selected from a variety of nitrides, oxides, borides, carbides, silicides, oxyfluorides, phosphides, metals, and/or carbon. While the compositions and method of preparation of this application produce a dimensionally stable product, it has been found that electrodes made in accordance with the process are not stable above 1000° C.

"Encyclopedia Of Materials Science", Vol. 2, Michael B. Bever, editor-in-chief, Pergamon Press, 1986, page 1413, summarizes the state of the art relating to electrode materials for electrochemical processing, including electrochemical research, electrolytic production of hydrogen, chlorine, chlorates, perchlorates, electrowinning of aluminum, and other electrochemical processes. At page 1413, a discussion of the electrometallurgy of aluminum points out that electrolysis of a cryolite-alumina ($Na_3AlF_6 + Al_2O_3$) melt is carried out using a carbon anode and an aluminum cathode to yield aluminum on the basis of the reaction:

$$2Al_2O_3 + 3C \rightarrow 4Al + 3CO_2$$

Carbon dioxide is formed at the anode. The types of carbon anode presently used are described, and it is also pointed out that carbon is used as a cell lining in the reduction cell. Lining failure and anode consumption are recognized as being major disadvantages in the present process.

The use of combustion synthesis (CS), also referred to as self-propagating high-temperature synthesis (SHS), for a variety of applications is reviewed by H.C. Yi et al, in *Journal Materials Science,* 25, 1159–1168 (1990). It is concluded that almost all the known ceramic materials can be produced using the SHS method, in product forms including abrasives, cutting tools, polishing powders; elements for resistance heating furnaces; high temperature lubricants; neutron attenuators; shape-memory alloys; high temperature structural alloys; steel melting additives; and electrodes for electrolysis of corrosive media. It is acknowledged that considerable research is needed, and major disadvantages arise in "achieving high product density and tight control over the reaction and products."

This article reports numerous materials produced by SHS and combustion temperatures for some of them, viz., borides, carbides, carbonitrides, nitrides, silicides, hydrides, intermetallics, chalcogenides, cemented carbides, and composites.

Combustion wave propagation rate and combustion temperature are stated to be dependent on stoichiometry of the reactants, pre-heating temperature, particle size, and amount of diluent.

J.W. McCauley et al, in "Simultaneous Preparation and Self-Centering Of Materials In The System Ti-B-C", *Ceramic Engineering and Science Proceedings,* 3, 538–554 (1982), describe SHS techniques using pressed powder mixtures of titanium and boron; titanium, boron and titanium boride; and titanium and boron carbide. Stoichiometric mixtures of titanium and boron were reported to react almost explosively (when initiated by a sparking apparatus) to produce porous, exfoliated structures. Reaction temperatures were higher than 2200° C. Mixtures of titanium, boron and titanium boride reacted in a much more controlled manner, with the products also being very porous. Reactions of titanium with boron carbide produce material with much less porosity. Particle size distribution of the titanium powder was found to have an important effect, as was the composition of the mixtures. Titanium particle sizes ranging from about 1 to about 200 microns were used.

R.W. Rice et al, in "Effect Of Self-Propagating Synthesis Reactant Compact Character On Ignition, Propagation and Resultant Microstructure", *Ceramic Engineering and Science Proceedings.* 7, 737–749 (1986), describe SHS studies of reactions using titanium powders to produce TiC, $TiB_2$ or TiC+$TiB_2$. Reactant powder compact density was found to be a major factor in the rate of reaction propagation, with the maximum rate being at about 60±10% theoretical density. Reactant particle size and shape were also reported to affect results, with titanium particles of 200 microns, titanium flakes, foil or wire either failing to ignite or exhibiting slower propagation rates. Particle size distribution of powder materials (Al, BC, Ti) ranged from 1 to 220 microns.

U.S. Pat. No. 4,909,842, issued Mar. 20, 1990 to S.D. Dunmead et al, discloses production of dense, finely grained composite materials comprising ceramic and metallic phases by SHS combined with mechanical pressure applied during or immediately after the SHS reaction. The ceramic phase or phases may be carbides or borides of titanium, zirconium, hafnium, tantalum or niobium, silicon carbide, or boron carbide. Intermetallic phases may be aluminides of nickel, titanium or copper, titanium nickelides, titanium ferrides, or cobalt titanides. Metallic phases may include aluminum, copper, nickel, iron or cobalt. The final product is stated to have a density of at least about 95% of the theoretical density only when pressure is applied during firing, and comprises generally spherically ceramic grains not greater than about 5 microns in diameter in an intermetallic and/or metallic matrix.

U.S. Pat. No. 4,948,767, issued Aug. 14, 1990 to D. Darracq et al, discloses a ceramic/metal composite material, which may be used as an electrode in a molten salt electrolysis cell for producing aluminum, having at least one ceramic phase and at least one metallic phase, wherein mixed oxides of cerium and at least one of aluminum, nickel, iron and copper are in the form of a skeleton of interconnected ceramic oxide grains, the skeleton being interwoven with a continuous metallic network of an alloy or intermetallic compound of cerium with at least one of aluminum, nickel, iron and copper. The ceramic phase may include "dopants" for increasing its electrical conductivity and/or density. The dopants may comprise pentavalent elements such as tantalum and niobium, or rare earth metals. Inert reinforcing fibers or tissues may also be present. The method of production involves reactive sintering, reactive hot-pressing or reactive plasma spraying a precursor mixture containing a cerium oxide, fluoride and/or boride and/or at least one of aluminum, nickel, iron and copper. When used as an anode, the material is coated with a protective layer of cerium oxyfluoride. A significant disadvantage of the process disclosed in this patent arises when the constituents have widely different melting points, which makes sintering or hot pressing into a dimensionally stable product impossible. Plasma spray is a very limited technique which is unsuitable to form a large anode or similar product within a reasonable time. It is also recognized that sintering of oxide and non-oxide materials is rarely possible, and the interface bonding of materials by this technique may be inadequate for acceptable mechanical and electrical properties.

Despite the recognition of the disadvantages of prior art electrodes and the suggestion of the possibility of producing electrodes by CS, to the best of applicant's knowledge there has been no successful application of CS techniques in the production of net shaped composite electrodes for electrochemical processing which possess improved oxidation resistance while retaining adequate electrical conductivity at temperatures above 1000° C.

The Yi et al article acknowledged above does not recognize or suggest the possibility of making composite electrodes by CS wherein desired properties are achieved by uniform dispersion of filler material in a ceramic or metal-ceramic core body.

It is apparent that a need exists for an electrode suitable for electrochemical processing, which exhibits improved oxidation and corrosion resistance and retains satisfactory electrical conductivity at temperatures above 1000° C., and which avoids the disadvantages inherent in conventional electrodes.

SUMMARY OF THE INVENTION

It is an object of the present invention to provide a composition for making an electrode suitable for electrochemical processing by combustion synthesis, which will meet the above need.

It is a further object of the invention to provide a method of making a net shaped electrode suitable for electrochemical processing, by combustion synthesis.

It is still another object of the invention to provide an electrode for electrochemical processing which will meet the above need.

The above and other objects of the invention will be apparent from the disclosure which follows.

According to the invention, there is provided a composition for making an electrode suitable for electrochemical processing by combustion synthesis, comprising from about 40% to about 90% by weight of a particulate or fibrous combustible mixture which, when ignited, is capable of forming an interconnecting network of a ceramic or metal-ceramic composite, and from about 10% to about 60% by weight of a particulate or fibrous filler material capable of providing said electrode with improved oxidation resistance and maintenance of adequate electrical conductivity at temperatures above 1000° C., the filler material being chosen from the group consisting of molybdenum silicide, silicon carbide, titanium carbide, boron carbide, boron nitride, zirconium boride, cerium oxide, cerium oxyfluoride, and mixtures thereof.

The term metal-ceramic composite is used herein to encompass also intermetallic-ceramic composites which form an interconnected network after combustion synthesis.

The invention further provides a dimensionally stable electrode for electrochemical processing made from the composition defined above.

The electrode of the invention may optionally contain up to about 5% by weight of a binder chosen from the group consisting of aluminum, nickel, copper, niobium, titanium, molybdenum, zirconium, rare earth metals, yttrium, and mixtures thereof, and a reinforcing material in fibrous form chosen from the group consisting of silicon carbide, graphite, a metal oxide, an elemental metal, a metal alloy, and mixtures thereof.

The invention further provides a method of making a net shaped electrode suitable for electrochemical processing and having improved oxidation resistance and electrical conductivity at temperatures above 1000° C., which comprises providing a uniform admixture containing from about 40% to about 90% by weight of a particulate or fibrous combustible mixture which, when ignited, is capable of forming an interconnecting network of a ceramic or metal-ceramic composite, and from about 10% to about 60% by weight of a particulate or fibrous filler material chosen from the group consisting of molybdenum silicide, silicon carbide, titanium carbide, boron carbide, boron nitride, zirconium boride, cerium oxide, cerium oxyfluoride, and mixtures thereof; compacting the admixture into a net shape in a die under a pressure of about 5 to about 25 ksi (about 3.5 to about 17.6 kg/mm$^2$); removing the net shape from the die; and igniting the combustible mixture whereby to obtain a dimensionally stable composite electrode.

The invention further provides an improvement in a process for producing metallic aluminum by electrolysis of molten cryolite-alumina, by providing non-consummable electrodes which minimize carbon consumption and eliminate formation of carbon dioxide at the anode, the electrodes comprising from about 40% to about 90% by weight of a ceramic composite or a metal-ceramic composite in the form of a dimensionally stable interconnected network, and from about 10% to about 60% by weight of a filler material uniformly dispersed in the network, the filler material being chosen from the group consisting of molybdenum silicide, silicon carbide, titanium carbide, boron carbide, boron nitride, zirconium boride, cerium oxide, cerium oxyfluoride, and mixtures thereof, the electrodes exhibiting improved corrosion and oxidation resistance and maintaining satisfactory electrical conductivity at temperatures above 1000° C.

In the conventional process for electrolysis of molten cryolite-alumina, carbon is generally used as the reducing agent and is supplied both from the carbon anode and from the carbon lining in the reduction cell. If carbon is used as the reducing agent in the method of the present invention, a carbon lining in the reduction cell would be needed as the carbon source. However, consumption of the anode is eliminated in the method of the invention along with the undesirable formation of carbon dioxide at the anode. The overall consumption of carbon should thus be minimized. Moreover, the method of the invention could use a different reducing agent, thus further minimizing or even eliminating carbon consumption.

Electrodes in accordance with the invention may be used both as anodes and cathodes. The process for making such electrodes offers flexibility in configuration since incorporation of cooling channels and a bipolar configuration of anodes is readily obtainable.

DETAILED DESCRIPTION OF THE INVENTION

Preferred embodiments of the invention will be described with particular reference to the improved high temperature oxidation and corrosion resistance and retention of electrical conductivity of electrodes having specific utility for electrowinning of aluminum. However, it should be recognized that other applications requiring such properties are within the scope of the invention.

The desired properties for electrodes for aluminum electrowinning are low reactivity to molten cryolite in comparison to graphite; resistivity of 5-10 milliohm/cm; resistance to oxidation at temperatures above 1000° C.; and adequate electrical conductivity at temperatures above 1000° C.

Electrodes in accordance with the present invention exhibit the above properties. Combustion synthesis is believed to provide the only economical way by which to make such electrodes. Moreover, in some instances combustion synthesis is the only way of producing such products, e.g., where the constituents have very different melting points, making sintering by conventional techniques impossible.

In a preferred composition for making an electrode in accordance with the invention the combustible mixture is chosen from the group consisting of:

from about 28% to about 32% titanium dioxide, about 25% to about 27% boron oxide, about 30% to about 35% aluminum, about 3% to about 4% titanium, about 1.5% to about 2% boron, about 4% to about 5% nickel, and about 0.8% to about 1.0% phosphorus;

from about 65% to about 75% titanium, and about 25% to about 35% boron;

from about 60% to about 65% molybdenum, and about 35% to about 40% silicon;

from about 75% to about 85% titanium, and about 15% to about 25% carbon;

from about 40% to about 50% titanium, and about 50% to about 60% nickel;

from about 10% to about 20% aluminum, and about 80% to about 90% nickel;

from about 50% to about 55% molybdenum, about 30% to about 35% nickel, and about 15% to about 7% silicon;

from about 77% to about 80% boron, and about 20% to about 23% carbon;

from about 73% to about 85% zirconium, and about 15% to about 27% boron; and mixtures thereof; all percentages being by weight of said combustible mixture.

The filler material in a preferred composition comprises up to about 25% molybdenum silicide, up to about 18% silicon carbide, up to about 35% titanium carbide, up to about 25% boron carbide, up to about 25% boron nitride, up to about 50% zirconium boride, up to about 25% cerium oxide, and mixtures thereof, based on the total weight of the composition.

As indicated above, the composition may also include up to about 5% by weight of an inorganic binder having a melting point lower than the combustion synthesis reaction temperature. Preferred binders include at least one of aluminum, nickel, and copper.

All the starting components of the composition are in particulate or fibrous form. When in particulate form the components preferably have an average particle size of less than 44 microns ($-325$ mesh). Fibrous material may have an average diameter of less than 44 microns and an aspect ratio of at least 2:1.

The method of the present invention for making a net shaped electrode is similar to that disclosed in application Ser. No. 07/648,165 acknowledged above. The disclosure of this copending application is incorporated herein by reference. In this method, a uniform mixture of the components is compacted into the desired net shape in a die under a pressure of about 5 to about 25 ksi, preferably about 7 ksi (about 4.9 kg/mm$^2$). The net shape mixture is then removed from the die and ignited by means of an electric arc, electric spark, flame, microwave, welding electrode, electron beam, laser or other conventional manner in order to initiate combustion synthesis. Alternatively, the electrode may be passed through an induction coil or furnace heated to the ignition temperature. If a binder is resent, it melts during combustion synthesis and becomes part of both the interconnected ceramic or metal-ceramic network and the filler material.

After combustion synthesis the product in the form of a dimensionally stable electrode contains at least one of molybdenum silicide, silicon carbide, nickel phosphide, titanium boride, titanium carbide, zirconium boride, titanium nickel intermetallics, aluminum nickel intermetallics, and aluminum nickel-silicon-molybdenum intermetallics. Combustion synthesis is believed to be the only way of making molybdenum silicides at relatively low temperatures.

All the compositions specified herein form a very thin adherent oxide layer on the surface of an electrode after being put in service. This is believed to be the reason for the high resistance to oxidation at temperatures above 1000° C. Moreover, stable electrical conductivity is retained at temperatures up to at least 1150° C.

It should be recognized that part or all of the combustible mixture may function, after ignition, in the same manner as the filler material in providing desired electrochemical properties. The binder, if present, may also function as a dopant for the ceramic composite after ignition.

A series of combustible mixtures were prepared and mixed in varying proportions with filler materials to produce exemplary products by combustion synthesis. Most of the starting materials were in particulate form with average particle sizes of less than 44 microns, i.e., passing 325 mesh screen. Nickel powder, when used, ranged from 3 to 100 microns in average particle size, with 3 microns being preferred. The components were mixed uniformly and compacted under pressures ranging from about 5 to about 25 ksi into net shapes suitable for testing.

The compositions of combustible mixtures, in weight percent, were as follows:

| Combustible Mixtures - Weight Percent | |
|---|---|
| Composition I | |
| $TiO_2$ | 30.00% |
| $B_2O_3$ | 26.25% |
| Al | 33.75% |
| Ti | 3.25% |
| B | 1.75% |
| Ni | 4.10% |
| P | 0.90% |
| Composition II | |
| Ti | 70% |
| B | 30% |
| Composition III | |
| Mo | 63% |
| Si | 37% |
| Composition IV | |
| Ti | 80% |
| C | 20% |
| Composition V | |
| Ti | 45% |
| Ni | 55% |
| Composition VI | |
| Al | 15-20% |
| Ni | 80-85% |
| Composition VII | |
| Mo | 52.5% |
| Ni | 32.1% |
| Si | 15.4% |
| Composition VIII | |
| B | 78.3% |
| C | 21.7% |
| Composition IX | |
| Zr | 75% |
| B | 25% |

Exemplary compositions utilizing various proportions of the above combustible mixtures were then prepared by uniform admixture with filler materials, compacted in a die, removed from the die, and ignited to form net shaped test specimens. These examples were as follows:

| | Example 1 | |
|---|---|---|
| Comp. I | | 16.67% |
| Comp. II | | 29.16% |
| SiC | | 16.67% |
| $MoSi_2$ | | 25.00% |
| $CeO_2$ | | 12.50% |
| | Example 2 | |
| Comp. I | | 40% |
| Comp. III | | 40% |
| SiC | | 10% |
| $CeO_2$ | | 10% |
| | Example 3 | |
| Comp. I | | 5% |
| Comp. II | | 25% |
| Comp. III | | 40% |
| SiC | | 10% |
| $CeO_2$ | | 15% |
| Ni(binder) | | 5% |
| | Example 4 | |
| Comp. III | | 40% |
| TiC | | 20% |
| SiC | | 15% |
| $CeO_2$ | | 25% |
| | Example 5 | |
| Comp. III | | 35% |
| TiC | | 25% |
| SiC | | 15% |
| $CeO_2$ | | 20% |
| Ni(binder) | | 5% |
| | Example 6 | |
| Comp. II | | 5% |
| Comp. III | | 35% |
| Tic | | 25% |
| SiC | | 10% |
| $CeO_2$ | | 20% |
| Ni(binder) | | 5% |
| | Example 7 | |
| Comp. III | | 40% |
| TiC | | 35% |
| SiC | | 10% |
| $CeO_2$ | | 15% |
| | Example 8 | |
| Comp. III | | 35% |
| Comp. V | | 20% |
| TiC | | 10% |
| SiC | | 10% |
| $CeO_2$ | | 15% |
| $MoSi_2$ | | 10% |
| | Example 9 | |
| Comp. III | | 35% |
| Comp. V | | 30% |
| SiC | | 10% |
| $CeO_2$ | | 15% |
| $MoSi_2$ | | 10% |
| | Example 10 | |
| Comp. III | | 30% |
| Comp. V | | 20% |
| TiC | | 10% |
| SiC | | 10% |
| $CeO_2$ | | 15% |
| $MoSi_2$ | | 10% |
| Ni(binder) | | 5% |
| | Example 11 | |
| Comp. II | | 10% |
| Comp. III | | 30% |
| Comp. V | | 45% |
| SiC | | 15% |
| | Example 12 | |
| Comp. III | | 40% |
| Comp. V | | 40% |
| SiC | | 10% |
| $MoSi_2$ | | 10% |
| | Example 13 | |
| Comp. II | | 10% |
| Comp. III | | 30% |
| Comp. V | | 37.5% |
| SiC | | 17.5% |
| Al(binder) | | 5% |
| | Example 14 | |
| Comp. III | | 50% |
| Comp. V | | 30% |
| SiC | | 10% |
| $MoSi_2$ | | 10% |
| | Example 15 | |
| Comp. III | | 30% |
| Comp. V | | 50% |
| SiC | | 10% |
| $MoSi_2$ | | 10% |
| | Example 16 | |
| Comp. III | | 10% |
| Comp. VI | | 80% |
| SiC | | 5% |
| $MoSi_2$ | | 5% |
| | Example 17 | |
| Comp. VI | | 90% |
| SiC | | 5% |

| | |
|---|---|
| MoSi$_2$ | 5% |
| Example 18 | |
| Comp. VI | 80% |
| SiC | 10% |
| MoSi$_2$ | 10% |
| Example 19 | |
| Comp. VI | 75% |
| SiC | 10% |
| MoCi$_2$ | 10% |
| Al(binder) | 5% |
| Example 20 | |
| Comp. III | 40% |
| Comp. VI | 50% |
| SiC | 5% |
| MoSi$_2$ | 5% |
| Example 21 | |
| Comp. III | 45% |
| Comp. VI | 45% |
| SiC | 5% |
| MoSi$_2$ | 5% |
| Example 22 | |
| Comp. III | 45% |
| Comp. VI | 40% |
| SiC | 5% |
| MoSi$_2$ | 5% |
| CeO$_2$ | 5% |
| Example 23 | |
| Comp. VI | 70% |
| SiC | 5% |
| MoSi$_2$ | 10% |
| CeO$_2$ | 10% |
| Al(binder) | 5% |
| Example 24 | |
| Comp. VI | 45% |
| SiC | 10% |
| MoSi$_2$ | 20% |
| CeO$_2$ | 20% |
| Al(binder) | 5% |
| Example 25 | |
| Mo | 52.5% |
| Ni | 32.1% |
| Si | 15.4% |
| Example 26 | |
| Comp. VI | 75% |
| B$_4$C | 25% |
| Example 27 | |
| Comp. VI | 30% |
| Comp. VII | 45% |
| B$_4$C | 25% |
| Example 28 | |
| Comp. VI | 30% |
| Comp. VII | 45% |
| B$_4$C | 15% |
| CeO$_2$ | 10% |
| Example 29 | |
| Comp. VI | 70% |
| Comp. VIII | 15% |
| B$_4$C | 10% |
| CeO$_2$ | 2.5% |
| Ti (binder) | 2.5% |
| Example 30 | |
| Comp. VI | 30% |
| Comp. VII | 45% |
| Comp. VIII | 7.5% |
| B$_4$C | 10% |
| CeO$_2$ | 5% |
| Ti (binder) | 2.5% |
| Example 31 | |
| Comp. III | 45% |
| Comp. VI | 45% |
| SiC | 5% |
| MoSi$_2$ | 5% |
| Example 32 | |
| Comp. VI | 38.0% |
| Comp. VII | 42.8% |
| B$_4$C | 4.8% |
| CeO$_2$ | 4.8% |
| MoSi$_2$ | 4.8 |
| SiC | 4.8% |
| Example 33 | |
| Comp. III | 45% |
| Comp. VI | 45% |
| SiC | 5% |
| CeO$_2$ | 5% |
| Example 34 | |
| Comp. III | 45% |
| Comp. VI | 40% |
| SiC | 5% |
| CeO$_2$ | 4% |
| MoSi$_2$ | 5% |
| Nb (binder) | 1% |
| Example 35 | |
| Comp. VII | 30% |
| Comp. IX | 20% |
| ZrB$_2$ | 50% |

Example 25 is illustrative of the concept of utilizing the combustible mixture (Composition VII), after ignition, to function as the filler material, i.e., an in situ formation of filler material.

Test specimens were prepared from all specific examples, each having dimensions of 3 mm × 3 mm × 10 mm. All specimens were tested for signs of catastrophic oxidation and instability by heating in air at 1050° C. for 16 hours. All specimens were found to have good oxidation resistance by this test. The greatest change in dimensions for any specimen was about 2%.

Test specimens from Examples 25, 32 and 34 were also tested in aluminum electrode cells with molten cryolite. Example 25 was run for 4 hours, and no change in dimensions was noted. Example 32 lasted for 6.25 hours, after which the tip of the electrode was lost in cryolite. This was an improvement over the normal life of a similar size graphite electrode. Example 34 was run for 3 hours (approximately the life of a similar size uncoated graphite electrode). The surface was noted as starting to deteriorate, but the specimen was intact.

The above tests in cryolite demonstrate superiority over conventional graphite electrodes.

Electrical resistivity was tested in specimens from Example 21. Resistivity remained unchanged after exposure to air for 24 days at 1050° C.

A specimen was prepared with the composition of Example 1, having a copper wire inserted through the center of the matrix. Combustion synthesis of this specimen was successful, and the resulting metal-ceramic composite adhered strongly to the copper wire surface. Accordingly, cathodes and anodes could be prepared, in accordance with the invention, in the form of a surface layer of the combustion synthesis product and filler material over a conductive core material. This would reduce the cost of such products.

Mechanical properties of all specimens of the specific examples were acceptable. In this connection, it is considered that electrodes need be capable only of supporting their own weight.

I claim:

1. A method of making a net shaped electrode suitable for electrochemical processing and having improved oxidation resistance, electrical conductivity and thermal conductivity at temperatures above 1000° C., which comprises:

selecting a particular or fibrous filler material from the group consisting of molybdenum silicide, silicon carbide, titanium carbide, boron carbide, boron nitride, zirconium boride, cerium oxide, cerium oxyfluoride, and mixtures thereof, so as to provide said electrode with improved oxidation resistance and thermal and electrical conductivity above 1000° C.;

providing a uniform admixture designed to cause the formation of an adherent oxide layer on the surface of said electrode during said electrochemical processing, said admixture containing from about 40% to about 90% by weight of a particulate or fibrous combustible mixture which, when ignited forms an interconnecting network of a ceramic or metal ceramic composite, and from about 10% to about 60% by weight of said particulate or fibrous filler material;

compacting said admixture into said net shape in a die under a pressure of about 5 to 25 ksi (about 3.5 to about 17.6 kg/mm$^2$);

removing said net shape from said die;

igniting said combustible mixture whereby to obtain a dimensionally stable composite electrode; and forming an adherent oxide layer on the surface of said electrode, after said electrode is put into service, said oxide layer lending to said electrode, said high resistance to oxidation and said stable electrical conductivity at temperatures above 1000° C.

2. The method of claim 1, wherein said combustible mixture is chosen from the group consisting of:

a) from about 28% to about 32% titanium dioxide, about 25% to about 27% boron oxide, about 30% to about 35% aluminum, about 3% to about 4% titanium, about 1.5% to about 2% boron, about 4% to about 5% nickel, and about 0.8% to about 1.0% phosphorus;

b) from about 65% to about 75% titanium, and about 25% to about 35% boron;

c) from about 60% to about 65% molybdenum, and about 35% to about 40% silicon;

from about 75% to about 85% titanium, and about 15% to about 25% carbon;

from about 40% to about 50% titanium, and about 50% to about 60% nickel;

from about 10% to about 20% aluminum, and about 80% to about 90% nickel;

from about 50% to about 55% molybdenum, about 30% to about 35% nickel, and about 15% to about 17% silicon;

from about 77% to about 80% boron, and about 20% to about 23% carbon;

from about 73% to about 85% zirconium, and about 15% to about 27% boron; and mixtures thereof; all percentages being by weight of said combustible mixture.

3. The method of claim 1, wherein said admixture comprises from about 40% to about 85% of said combustible mixture, from about 10% to about 55% of said filler material, and up to about 5% by weight of a particulate or fibrous inorganic binder having a melting point lower than the combustion synthesis reaction temperature.

4. The method of claim 3, wherein said binder is at least one of aluminum, nickel, copper, niobium, titanium, molybdenum, zirconium, rare earth metals, and yttrium.

5. The method of claim 1, wherein said filler material comprises up to about 25% molybdenum silicide, up to about 18% silicon carbide, up to about 35% titanium carbide, up to about 25% boron carbide, up to about 25% boron nitride, up to about 50% zirconium boride, up to about 25% cerium oxide, and mixtures thereof, based on the total weight of said admixture.

* * * * *

UNITED STATES PATENT AND TRADEMARK OFFICE
CERTIFICATE OF CORRECTION

PATENT NO. : 5,316,718
DATED : May 31, 1994
INVENTOR(S) : Jainagesh A. Sekhar

It is certified that error appears in the above-indentified patent and that said Letters Patent is hereby corrected as shown below:

Column 11, line 28, (claim 2), "a)" should be deleted

Column 11, line 34, (claim 2), "b)" should be deleted

Column 12, line 1, (claim 2), "c)" should be deleted

Signed and Sealed this

First Day of November, 1994

Attest:

BRUCE LEHMAN

Attesting Officer

*Commissioner of Patents and Trademarks*